United States Patent
Yamamoto

(10) Patent No.: US 11,731,598 B2
(45) Date of Patent: Aug. 22, 2023

(54) BRAKE CONTROL DEVICE FOR VEHICLE

(71) Applicant: ADVICS CO., LTD., Kariya (JP)

(72) Inventor: Yusaku Yamamoto, Kariya (JP)

(73) Assignee: ADVICS CO., LTD., Kariya (JP)

(*) Notice: Subject to any disclaimer, the term of this patent is extended or adjusted under 35 U.S.C. 154(b) by 230 days.

(21) Appl. No.: 17/418,600

(22) PCT Filed: Dec. 25, 2019

(86) PCT No.: PCT/JP2019/050818
§ 371 (c)(1),
(2) Date: Jun. 25, 2021

(87) PCT Pub. No.: WO2020/138164
PCT Pub. Date: Jul. 2, 2020

(65) Prior Publication Data
US 2022/0144229 A1 May 12, 2022

(30) Foreign Application Priority Data
Dec. 26, 2018 (JP) .................................. 2018-242689

(51) Int. Cl.
*B60T 8/1755* (2006.01)
*B60T 8/172* (2006.01)

(52) U.S. Cl.
CPC ............ *B60T 8/1755* (2013.01); *B60T 8/172* (2013.01); *B60T 2230/04* (2013.01)

(58) Field of Classification Search
CPC ...... B60T 8/1755; B60T 8/172; B60T 8/1766; B60T 8/26; B60T 8/32; B60T 2230/04
See application file for complete search history.

(56) References Cited

U.S. PATENT DOCUMENTS

| 8,046,130 B2* | 10/2011 | Takahara | ............... B60T 8/1766 701/79 |
| 8,108,106 B2* | 1/2012 | Takahara | ................. B60G 7/00 701/41 |

(Continued)

FOREIGN PATENT DOCUMENTS

JP 2017121851 A 7/2017

OTHER PUBLICATIONS

Tavernini et al, D., Feedback Brake Distribution Control for Minimum Pitch, Google Scholar, Vehicle System Dynamics, Dec. 2016, pp. 1-22. (Year: 2016).*

(Continued)

*Primary Examiner* — Russell Frejd
(74) *Attorney, Agent, or Firm* — Buchanan Ingersoll & Rooney PC

(57) ABSTRACT

A brake control device includes: a decrease determination unit that determines whether a requested braking force for a vehicle is decreasing; and a brake control unit which, on the condition that the decrease determination unit determines that the requested braking force is decreasing during deceleration of the vehicle, executes ratio change decrease control of reducing the braking force of the vehicle according to the decrease of the requested braking force, while making a braking force distribution ratio smaller than a reference braking force distribution ratio. The reference braking force distribution ratio is the braking force distribution ratio at a time point when the requested braking force starts to decrease.

14 Claims, 7 Drawing Sheets

(56) References Cited

U.S. PATENT DOCUMENTS

| | | | |
|---|---|---|---|
| 2013/0006476 A1* | 1/2013 | Yamazaki | B60W 10/18 701/42 |
| 2020/0094797 A1* | 3/2020 | Shoji | B60W 40/076 |
| 2021/0114569 A1* | 4/2021 | Yamamoto | B60W 40/11 |

OTHER PUBLICATIONS

International Search Report (PCT/ISA/210) with translation and Written Opinion (PCT/ISA/237) dated Feb. 10, 2020, by the Japanese Patent Office as the International Searching Authority for International Application No. PCT/JP2019/050818.

* cited by examiner

VEHICLE BODY ACCELERATION

BRAKING OPERATION AMOUNT (REQUESTED BRAKING FORCE)

BRAKING FORCE OF VEHICLE

FRONT WHEEL BRAKING FORCE

REAR WHEEL BRAKING FORCE

BRAKING OPERATION
AMOUNT
(REQUESTED
BRAKING FORCE)

BRAKING FORCE
OF VEHICLE

FRONT WHEEL
BRAKING FORCE

REAR WHEEL
BRAKING FORCE

VEHICLE BODY ACCELERATION

BRAKING OPERATION AMOUNT (REQUESTED BRAKING FORCE)

BRAKING FORCE OF VEHICLE

FRONT WHEEL BRAKING FORCE

REAR WHEEL BRAKING FORCE

FRONT WHEEL
BRAKING FORCE

REAR WHEEL
BRAKING FORCE

BRAKE CONTROL DEVICE FOR VEHICLE

TECHNICAL FIELD

The present disclosure relates to a brake control device for a vehicle.

BACKGROUND ART

Patent Literature 1 discloses that when a vehicle is decelerated by application of braking force, a pitch angle of the vehicle changes to the nose dive side. It is also disclosed that when the braking of the vehicle is released, the pitch angle of the vehicle changes to the nose lift side.

CITATIONS LIST

Patent Literature

Patent Literature 1: JP 2017-121851 A

SUMMARY

Technical Problems

If a change rate of the pitch angle, which is a rotation speed in the pitching direction of the vehicle accompanying the brake release of the vehicle, is large, an occupant of the vehicle may feel discomfort.

Solution to Problems

A brake control device for a vehicle for solving the above problem is applied to a vehicle in which an anti-dive force being a force that displaces a vehicle front portion upward is generated when a braking force is applied to a front wheel, an anti-lift force being a force that displaces a vehicle rear portion downward is generated when the braking force is applied to a rear wheel, and when a front wheel braking force being a braking force applied to the front wheel has a value equal to a rear wheel braking force being a braking force applied to the rear wheel, a first force that is one of the anti-dive force and the anti-lift force becomes larger than a second force that is another of the anti-dive force and the anti-lift force. In the case in which, among the front wheel braking force and the rear wheel braking force, a braking force that generates the first force is set as a first braking force, a braking force that generates the second force is set as a second braking force, and a ratio of the first braking force to the second braking force is set as a braking force distribution ratio, the brake control device includes: a decrease determination unit that determines whether or not a requested braking force for the vehicle is decreasing; and a brake control unit that executes, on a condition that the decrease determination unit determines that the requested braking force is decreasing during deceleration of the vehicle, ratio change decrease control of reducing the braking force of the vehicle in accordance with the decrease of the requested braking force, while making the braking force distribution ratio smaller than a reference braking force distribution ratio being the braking force distribution ratio at a time point when the requested braking force starts to decrease.

According to the above configuration, in the ratio change decrease control, the front wheel braking force and the rear wheel braking force are respectively reduced so as to make the braking force distribution ratio become smaller than the reference braking force distribution ratio. That is, when the ratio change decrease control is executed, the first braking force is preferentially reduced over the second braking force. Therefore, the first force at a time point when the braking of the vehicle is released becomes small easily as compared with the case in which the first braking force and the second braking force are reduced while the braking force distribution ratio is held at the reference braking force distribution ratio. By making the first force small at the time point when the braking of the vehicle is released, the change rate of the pitch angle of the vehicle caused by the decrease in the braking force of the vehicle can be made small. As a result, the occupant of the vehicle is not likely to feel discomfort when the braking of the vehicle is released.

DESCRIPTION OF EMBODIMENTS

First Embodiment

Hereinafter, a first embodiment of a brake control device for a vehicle is described with reference to FIGS. 1 to 5.

Figure 1:
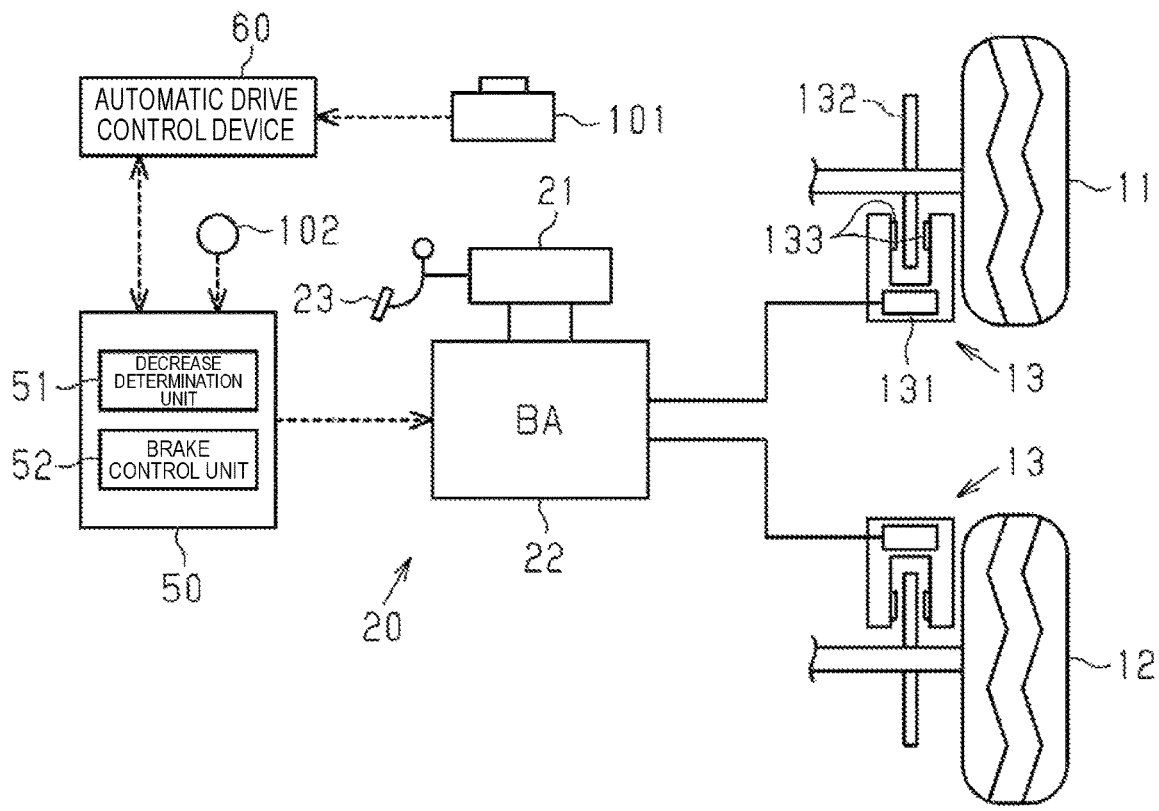
FIG. 1 is a diagram showing a functional configuration of a brake control device for a vehicle according to a first embodiment and a schematic configuration of a vehicle including the brake control device.

FIG. 1 illustrates a schematic configuration of a vehicle including a brake control device 50 of the present embodiment. As illustrated in FIG. 1, a braking force is applied to a front wheel 11 and a rear wheel 12 of the vehicle by the operation of braking mechanisms 13. Each braking mechanism 13 is configured such that a force pressing a friction material 133 against a rotating body 132 rotating integrally with the wheels 11 or 12 increases as a WC pressure PWC, which is the hydraulic pressure in a wheel cylinder 131, increases. Therefore, each braking mechanism 13 can apply a larger braking force to the wheels 11 or 12 as the WC pressure PWC becomes higher. In the following description, the braking force applied to the front wheel 11 may be referred to as a "front wheel braking force BPA", and the braking force applied to the rear wheel 12 may be referred to as a "rear wheel braking force BPB".

A braking device 20 for the vehicle includes a fluid pressure generation device 21 and a brake actuator 22 to which a brake fluid is supplied from the fluid pressure generation device 21. The fluid pressure generation device 21 is connected with a braking operation member 23 such as a brake pedal. Further, the fluid pressure generation device 21 generates a fluid pressure corresponding to a braking operation amount that is an operation amount of the braking operation member 23 by a driver of the vehicle. The brake actuator 22 is connected to each wheel cylinder 131. Therefore, when the braking operation member 23 is operated, an amount of brake fluid corresponding to the operation amount is supplied to each wheel cylinder 131. In other words, the braking force is applied to each of the wheels 11 and 12.

The operation of the brake actuator 22 can also be controlled by the brake control device 50. By using the brake control device 50 to control the brake actuator 22, the front wheel braking force BPA and the rear wheel braking force BPB can be individually controlled.

Figure 2:
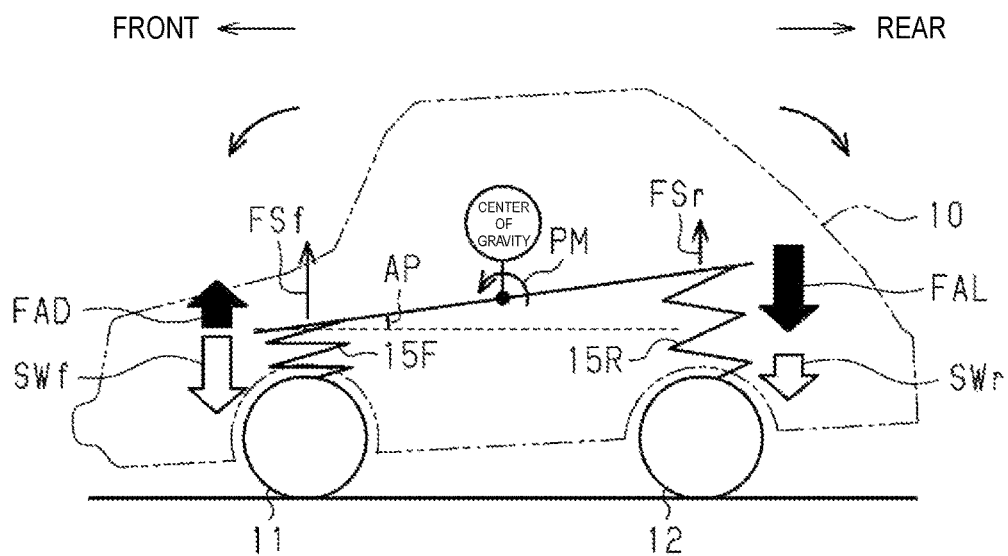
FIG. 2 is a schematic diagram illustrating a state in which the vehicle nose-dives in the first embodiment.

Next, pitching motion of the vehicle at the time of vehicle braking is described with reference to FIG. 2. In FIG. 2, a sprung weight SWf on the front wheel side and a sprung weight SWr on the rear wheel side are represented by white arrows. The sprung weight is a weight in the vertical direction input from a vehicle body to a suspension by a vehicle weight and a pitching moment PM.

When a vehicle 10 decelerates by the application of the braking force, the pitching moment PM as indicated by a solid arrow in FIG. 2 is generated in the vehicle 10, and the vehicle undergoes the pitching motion toward the nose dive side. Nose dive is a behavior of the vehicle that displaces the front portion of the vehicle 10 downward and displaces the rear portion of the vehicle 10 upward. On the other hand, a behavior of the vehicle 10 that displaces the front portion of the vehicle 10 upward and displaces the rear portion of the vehicle 10 downward is referred to as "nose lift". When the vehicle 10 undergoes the pitching motion toward the nose dive side, a pitch angle AP of the vehicle 10 increases, and on the other hand, when the vehicle 10 undergoes the pitching motion toward the nose lift side, the pitch angle AP decreases.

When the vehicle 10 undergoes the pitching motion toward the nose dive side, the sprung weight SWf on the front wheel side increases to cause a front wheel spring 15F constituting the front-wheel suspension to contract. As a result, as indicated by a solid arrow in FIG. 2, a front wheel spring restoring force FSf, which is the restoring force of the front wheel spring 15F, is applied to the vehicle 10. In addition, when the vehicle 10 undergoes the pitching motion toward the nose dive side, the sprung weight SWr on the rear wheel side decreases to cause a rear wheel spring 15R constituting the rear wheel suspension to extend. As a result, as indicated by a solid arrow in FIG. 2, a rear wheel spring restoring force FSr, which is the restoring force of the rear wheel spring 15R, is applied to the vehicle 10.

In addition, an anti-dive force FAD and an anti-lift force FAL can be generated in the vehicle 10 as indicated by black arrows in FIG. 2. The anti-dive force FAD is a force that displaces the vehicle front portion upward when the braking force is applied to the front wheel 11, and increases as the front wheel braking force BPA increases. The anti-lift force FAL is a force that displaces the vehicle rear portion downward when the braking force is applied to the rear wheel 12, and increases as the rear wheel braking force BPB increases.

The geometries of the front wheel suspension and the rear wheel suspension in the vehicle 10 are often set such that the anti-lift force FAL becomes larger than the anti-dive force FAD when the front wheel braking force BPA has the same value as the rear wheel braking force BPB. In the present embodiment, it is assumed that the anti-lift force FAL is larger than the anti-dive force FAD. That is, in the present embodiment, the anti-lift force FAL corresponds to the "first force", and the anti-dive force FAD corresponds to the "second force". In addition, the rear wheel braking force BPB generating the anti-lift force FAL corresponds to the "first braking force", and the front wheel braking force BPA generating the anti-dive force FAD corresponds to the "second braking force".

As illustrated in FIG. 2, when the vehicle 10 stops in a nose-dived state, the vehicle 10 undergoes the pitching motion toward the nose lift side by the anti-dive force FAD and the anti-lift force FAL. That is, the pitch angle AP of the vehicle decreases. At this time, because the anti-lift force FAL increases as a proportion of the rear wheel braking force BPB becomes larger among the entire braking force being the sum of the front wheel braking force BPA and the rear wheel braking force BPB, the change rate of the pitch angle AP easily increases. On the other hand, because the anti-lift force FAL decreases as the proportion of the front wheel braking force BPA becomes larger in the entire braking force, the change rate of the pitch angle AP does not easily increase.

Next, a control configuration of the vehicle is described with reference to FIG. 1.

The vehicle 10 includes, as a control device, an automatic drive control device 60 in addition to the brake control device 50. During automatic driving of the vehicle 10, the automatic drive control device 60 calculates a control amount of a power source of the vehicle such as an engine and the braking device 20, and outputs the calculated control amount to other control devices. For example, after calculating the requested braking force BPR as the control amount of the braking device 20, the automatic drive control device 60 outputs the requested braking force BPR to the brake control device 50. When the requested braking force BPR is input from the automatic drive control device 60, the brake control device 50 operates the brake actuator 22 so that the entire braking force becomes the requested braking force BPR.

Note that the automatic drive control device 60 acquires information outside the vehicle 10 from such as a camera 101 and a radar. Examples of the information here include information on the presence or absence of a preceding vehicle, an inter-vehicle distance from the preceding vehicle, and a road surface on which the vehicle travels. Examples of the information on the road surface include a turning radius of the road surface and a road surface slope.

The brake control device 50 includes a decrease determination unit 51 and a brake control unit 52 as functional units. The decrease determination unit 51 determines whether or not the requested braking force BPR being the braking force requested for the vehicle 10 is decreasing when the vehicle 10 is decelerating by the application of the braking force to the vehicle 10. In the case in which the brake actuator 22 is controlled based on the requested braking force BPR input from the automatic drive control device 60, the decrease determination unit 51 determines whether or not the requested braking force BPR input from the automatic drive control device 60 is decreasing. On the other hand, in the case in which the braking force is applied to the vehicle 10 by the braking operation of the driver, the decrease determination unit 51 acquires a braking operation amount BPINPUT of the driver as a correlation value of the requested braking force BPR, and determines whether or not the requested braking force BPR is decreasing based on a changing manner of the braking operation amount BPINPUT.

The braking operation amount BPINPUT includes the operation amount of the braking operation member 23 by the driver, the fluid pressure generated in the fluid pressure generation device 21 by the braking operation by the driver, and the like. The vehicle 10 is provided with an operation amount detection sensor 102 that detects the braking operation amount BPINPUT as such. Then, the brake control device 50 calculates the braking operation amount BPINPUT based on the detection signal of the operation amount detection sensor 102.

The brake control unit 52 controls the front wheel braking force BPA and the rear wheel braking force BPB through the control of the brake actuator 22. That is, when the decrease determination unit 51 determines that the requested braking force BPR is decreasing, the brake control unit 52 varies a braking force distribution ratio RT, which is a ratio of the first braking force to the second braking force, through the control of the brake actuator 22. In the present embodiment, the braking force distribution ratio RT is a ratio of the rear wheel braking force BPB to the front wheel braking force BPA.

Figure 3:
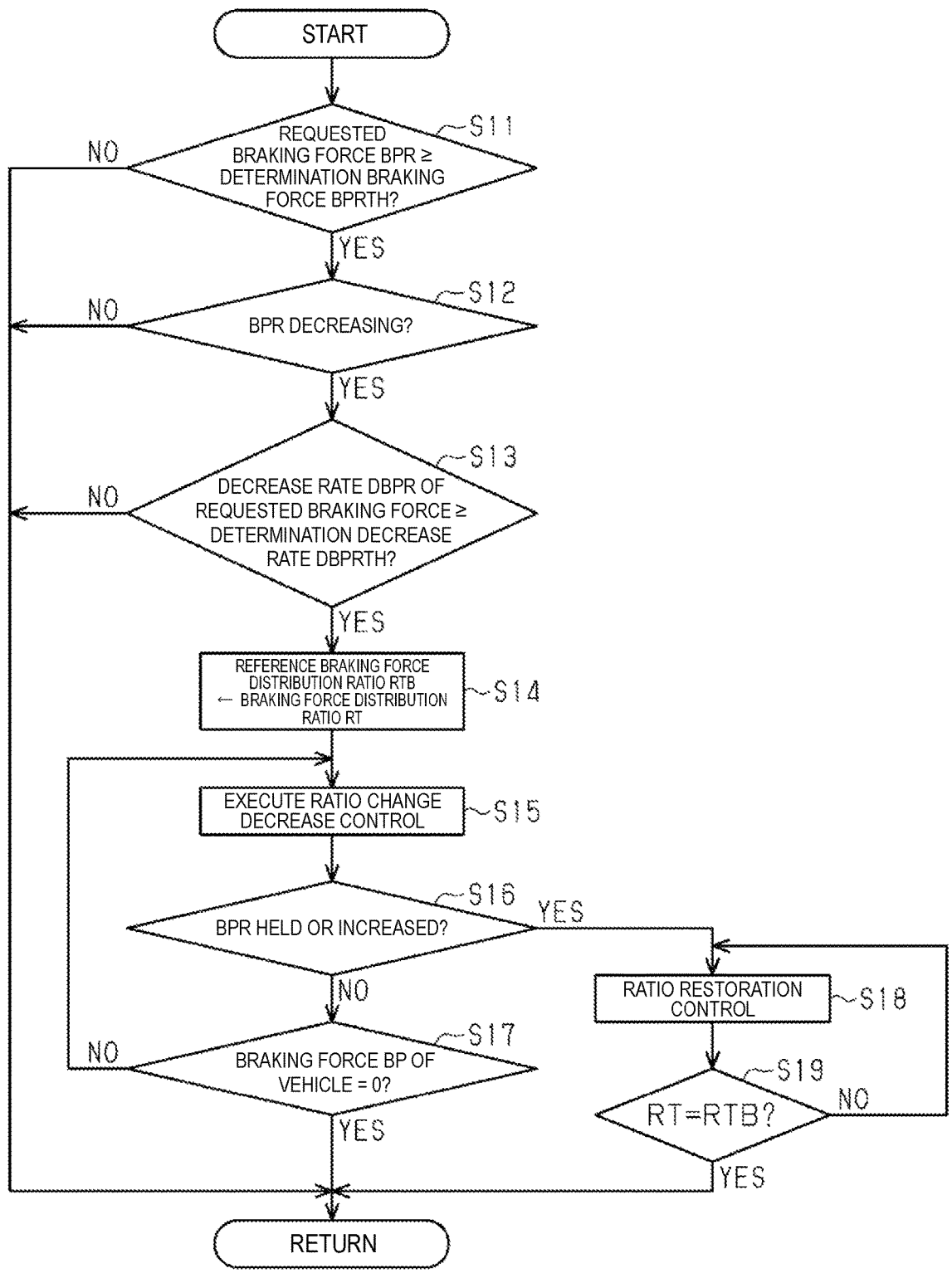
FIG. 3 is a flowchart for explaining a processing routine executed by the brake control device.

Next, with reference to FIG. 3, a processing routine executed by the brake control device 50 to execute ratio change decrease control described later is described. This processing routine is repeatedly executed when the braking force is being applied to the vehicle 10.

In this processing routine, in step S11, it is determined whether or not the requested braking force BPR is equal to or more than the determination braking force BPRTh. In this determination, in the case in which the braking force is applied to the vehicle 10 by automatic driving, the requested braking force BPR input from the automatic drive control device 60 to the brake control device 50 is used. In the case in which the braking force is applied to the vehicle 10 by the braking operation of the driver, the braking force requested by the driver is calculated as the requested braking force BPR based on the braking operation amount BPINPUT, and the requested braking force BPR is used in the determination. The determination braking force BPRTh is set as a criterion for determining whether or not an amount of increase in the pitch angle AP caused by the braking of the vehicle 10 is large.

Therefore, if the requested braking force BPR is equal to or more than the determination braking force BPRTh, it can be determined that the amount of increase in the pitch angle AP due to the braking of the vehicle 10 is large.

If the requested braking force BPR is less than the determination braking force BPRTh (S11: NO), the present processing routine is once terminated. On the other hand, if the requested braking force BPR is equal to or more than the determination braking force BPRTh (S11: YES), the processing proceeds to the next step S12. In step S12, the decrease determination unit 51 determines whether or not the requested braking force BPR is decreasing. That is, the decrease determination unit 51 calculates a product of a value obtained by time-differentiating the requested braking force BPR and "−1" as a decrease rate DBPR of the requested braking force BPR. Then, the decrease determination unit 51 determines that the requested braking force BPR is decreasing if the calculated decrease rate DBPR is a positive value. On the other hand, if the decrease rate DBPR is "0" or a negative value, the decrease determination unit 51 does not determine that the requested braking force BPR is decreasing.

If it is not determined that the requested braking force BPR is decreasing (S12: NO), this processing routine is once terminated. On the other hand, if it is determined that the requested braking force BPR is decreasing (S12: YES), the processing proceeds to the next step S13. In step S13, it is determined whether or not the decrease rate DBPR of the requested braking force is equal to or more than a determination decrease rate DBPRTh. In the case in which the front wheel braking force BPA and the rear wheel braking force BPB respectively decreases by the decrease of the requested braking force BPR, the anti-dive force FAD becomes small according to the decrease of the front wheel braking force BPA, and the anti-lift force FAL becomes small according to the decrease of the rear wheel braking force BPB. At this time, if the decrease rate DBPR is small, a response delay of the decrease in the anti-dive force FAD does not easily occur with respect to the decrease in the front wheel braking force BPA. Similarly, a response delay of the decrease in the anti-lift force FAL does not easily occur with respect to the decrease in the rear wheel braking force BPB. On the other hand, if the decrease rate DBPR is large, a response delay of the decrease in the anti-dive force FAD easily occurs with respect to the decrease in the front wheel braking force BPA. Similarly, a response delay of the decrease in the anti-lift force FAL easily occurs with respect to the decrease in the rear wheel braking force BPB. That is, if the decrease rate DBPR is large, the anti-lift force FAL may not yet become "0" even when the front wheel braking force BPA has become "0". Similarly, even when the rear wheel braking force BPB has become "0", the anti-dive force FAD may not yet become "0". Therefore, the determination decrease rate DBPRTh is set in order to determine whether or not there is a possibility of occurrence of the above response delay on the basis of the decrease rate DBPR.

If the decrease rate DBPR of the requested braking force is less than the determination decrease rate DBPRTh, the above response delay does not occur. Therefore, if the decrease rate DBPR is less than the determination decrease rate DBPRTh (S13: NO), the present processing routine is once terminated. On the other hand, if the decrease rate DBPR is equal to or more than the determination decrease rate DBPRTh, the above response delay may occur. Therefore, if the decrease rate DBPR is equal to or more than the determination decrease rate DBPRTh (S13: YES), the processing proceeds to the next step S14.

In step S14, a reference braking force distribution ratio RTB is set to the same value as the braking force distribution ratio RT at the present time point by the brake control unit 52. In other words, the reference braking force distribution ratio RTB is the braking force distribution ratio RT at the time point when it is determined that the requested braking force BPR is decreasing, that is, the braking force distribution ratio RT at the time point when the decrease of the requested braking force BPR starts. Subsequently, in the next step S15, the brake control unit 52 executes the ratio change decrease control of reducing the braking force BP of the vehicle 10 according to the decrease of the requested braking force BPR while the braking force distribution ratio RT is made smaller than the reference braking force distribution ratio RTB. In the ratio change decrease control, the rear wheel braking force BPB is reduced preferentially over the front wheel braking force BPA. Specifically, the decrease rate of the rear wheel braking force BPB is larger than the decrease rate of the front wheel braking force BPA. Therefore, the rear wheel braking force BPB becomes "0" before the front wheel braking force BPA. That is, the braking force distribution ratio RT becomes "0". After the braking force distribution ratio RT becomes "0" in this manner, the front wheel braking force BPA is reduced according to the decrease of the requested braking force BPR while the rear wheel braking force BPB is held at "0". That is, it can also be said that the ratio change decrease control is control to set the rear wheel braking force BPB being the first braking force to "0" earlier than the front wheel braking force BPA being the second braking force.

In the next step S16, it is determined whether or not the requested braking force BPR is held or increasing during the execution of the ratio change decrease control. That is, the decrease rate DBPR of the requested braking force during the execution of the ratio change decrease control is calculated. If the decrease rate DBPR is "0", it can be determined that the requested braking force BPR is held. If the decrease rate DBPR is a negative value, it can be determined that the requested braking force BPR is increasing. If it is determined that the requested braking force BPR is held, the determination in step S16 is "YES". If it is determined that the requested braking force BPR is increasing, the determination in step S16 is "YES".

If it is not determined that the requested braking force BPR is held or increasing (S16: NO), because this means that the requested braking force BPR is decreasing, the process proceeds to the next step S17. In step S17, it is determined whether or not the braking force BP of the vehicle 10 has become "0". For example, if the requested braking force BPR is "0", it can be determined that the braking force BP of the vehicle 10 has become "0". If it is not determined that the braking force BP of the vehicle 10 has become "0" (S17: NO), the braking of the vehicle 10 is not released yet, and thus the processing proceeds to step S15 described above. That is, the ratio change decrease control is continued. On the other hand, if it is determined that the braking force BP of the vehicle 10 has become "0" (S17: YES), because this means that the braking of the vehicle 10 is released, this processing routine is terminated. That is, the ratio change decrease control is terminated.

On the other hand, if it is determined in step S16 that the requested braking force BPR is held or increasing (YES), the ratio change decrease control is terminated, and the processing proceeds to the next step S18. In step S18, the brake control unit 52 executes ratio restoration control of increasing the braking force distribution ratio RT to the reference braking force distribution ratio RTB by adjusting the front wheel braking force BPA and the rear wheel braking force BPB, respectively. That is, if it is not determined that the requested braking force BPR is decreasing during the execution of the ratio change decrease control, the ratio change decrease control is terminated, and the ratio restoration control is executed. During the execution of the ratio restoration control, a magnitude of the anti-lift force FAL changes according to the change of the rear wheel braking force BPB, and a magnitude of the anti-dive force FAD changes according to the change of the front wheel braking force BPA. Therefore, if the change rates of the rear wheel braking force BPB and the front wheel braking force BPA are large, the change rates of the anti-lift force FAL and the anti-dive force FAD become large, and the pitch angle AP of the vehicle 10 may change greatly. Therefore, even if the pitch angle AP of the vehicle 10 changes due to the change in the anti-lift force FAL and the anti-lift force FAL, the change rate of the rear wheel braking force BPB and the change rate of the front wheel braking force BPA are set so that the pitch angle AP gradually changes.

In the ratio restoration control under the situation in which the requested braking force BPR is held, the braking force distribution ratio RT is changed while the sum of the front wheel braking force BPA and the rear wheel braking force BPB is held. On the other hand, in the ratio restoration control under the situation in which the requested braking force BPR is increasing, the braking force distribution ratio RT is changed while the sum of the front wheel braking force BPA and the rear wheel braking force BPB is changed according to the increase of the requested braking force BPR.

In the case of the above ratio restoration control being executed, the processing proceeds to the next step S19. In step S19, it is determined whether or not the braking force distribution ratio RT has become the same value as the reference braking force distribution ratio RTB by executing the ratio restoration control. If it is not determined that the braking force distribution ratio RT has become the same value as the reference braking force distribution ratio RTB (S19: NO), the processing proceeds to step S18 described above. That is, the ratio restoration control is continued. On the other hand, if it is determined that the braking force distribution ratio RT has become the same value as the reference braking force distribution ratio RTB (S19: YES), the ratio restoration control is terminated, and the processing routine is once terminated.

Incidentally, in the case in which, although the requested braking force BPR is decreasing, the requested braking force BPR at the time point of determining that the requested braking force BPR is decreasing is less than the determination braking force BPRTh, the front wheel braking force BPA and the rear wheel braking force BPB are reduced while the braking force distribution ratio RT is held. In addition, also in the case in which, although the requested braking force BPR is equal to or more than the determination braking force BPRTh, the decrease rate DBPR of the requested braking force is less than the determination decrease rate DBPRTh, the front wheel braking force BPA and the rear wheel braking force BPB are reduced while the braking force distribution ratio RT is held.

Next, functions and effects of the present embodiment are described with reference to FIGS. 4 and 5.

FIGS. 4(a) to 4(e) illustrate an example of the case in which the ratio change decrease control is executed until the braking of the vehicle 10 is released. When the braking operation amount BPINPUT starts to decrease while the vehicle 10 is decelerating by the application of the braking force BP, it is determined that the requested braking force BPR is decreasing at a timing T11. In the example illustrated in FIG. 4, the requested braking force BPR at the timing T11 is equal to or more than the determination braking force BPRTh, and the decrease rate DBPR of the requested braking force is equal to or more than the determination decrease rate DBPRTh. Therefore, the ratio change decrease control is started after the reference braking force distribution ratio RTB is set to the same value as the braking force distribution ratio RT at the timing T11.

Figure 4A:
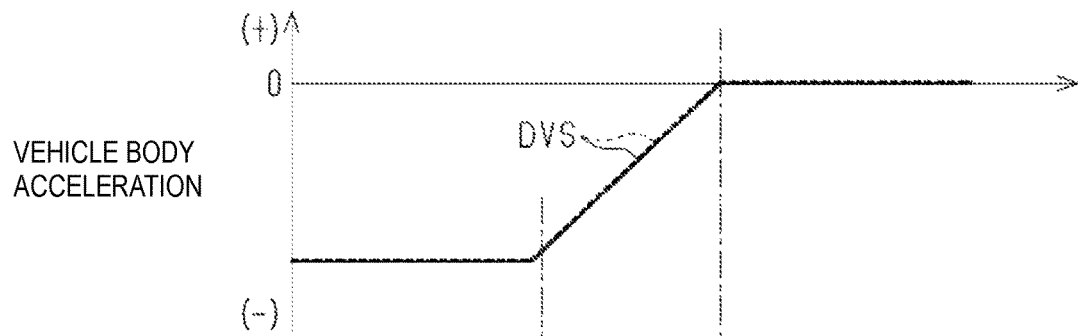
FIGS. 4(a) to 4(e) are timing charts in the case in which ratio change decrease control is executed.
Figure 4B:
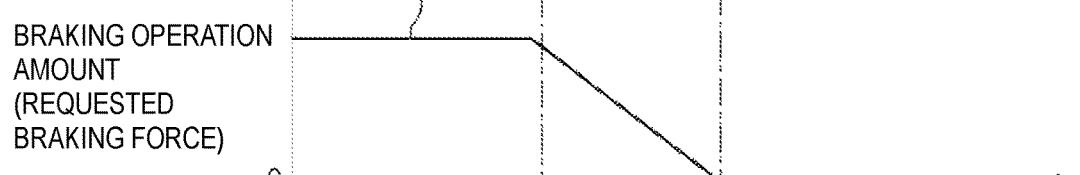
Figure 4C:
Figure 4D:
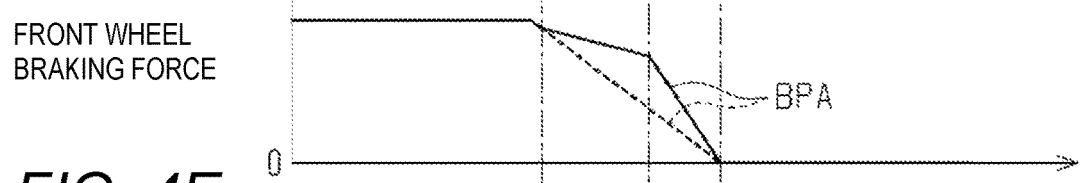
Figure 4E:
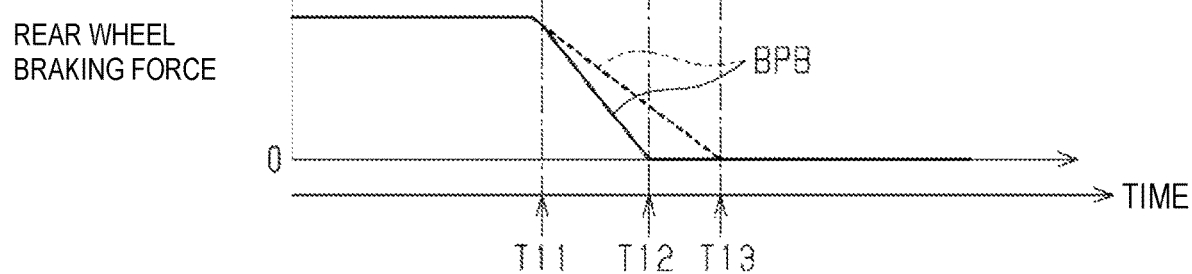

FIGS. 4(a) and 4(c) show, by broken lines, transitions of a vehicle body acceleration DVS and a braking force BP of the vehicle 10 in a comparative example, respectively, in which the braking force BP of the vehicle 10 is reduced while the braking force distribution ratio RT is maintained at the reference braking force distribution ratio RTB. Also, FIGS. 4(d) and 4(e) show by broken lines, transitions of the front wheel braking force BPA and the rear wheel braking force BPB in the comparative example, respectively. In the comparative example, the front wheel braking force BPA and the rear wheel braking force BPB each become "0" at a timing T13 when the requested braking force BPR becomes "0". That is, the braking force is applied to the rear wheel 12 until immediately before the braking of the vehicle is released.

In the present embodiment, when the front wheel braking force BPA has the same value as the rear wheel braking force BPB, the anti-lift force FAL is larger than the anti-dive force FAD. Therefore, in the case of the comparative example, if the decrease rate DBPR of the requested braking force is large, a response delay of the decrease of the anti-lift force FAL occurs with respect to the decrease of the rear wheel braking force BPB, and the anti-lift force FAL may not yet be "0" even when the rear wheel braking force BPB becomes "0". That is, although the braking of the vehicle 10 is released, the anti-lift force FAL still remains. In this case, due to the influence of the remaining anti-lift force FAL, the change in the pitch angle AP of the vehicle is not yet finished even after the braking of the vehicle 10 is released.

In this regard, in the present embodiment, the front wheel braking force BPA and the rear wheel braking force BPB are respectively reduced as indicated by solid lines in FIGS. 4(d) and 4(e) by executing the ratio change decrease control. That is, the rear wheel braking force BPB is reduced so that the rear wheel braking force BPB becomes "0" at a timing T12 before the timing T13. On the other hand, the front wheel braking force BPA is gradually reduced in a period from the timing T11 to the timing T12, and the front wheel braking force BPA is suddenly reduced in a period from the timing T12 to the timing T13. As a result, as illustrated in FIGS. 4(a) and 4(c), the braking force BP and the vehicle body acceleration DVS of the vehicle 10 can be changed as in the comparative example while the braking force distribution ratio RT is changed from the reference braking force distribution ratio RTB.

In the present embodiment, as shown in FIG. 4(e), the rear wheel braking force BPB becomes "0" at the timing T12 before the timing T13. Therefore, even if the response delay of the decrease in the anti-lift force FAL occurs with respect to the decrease in the rear wheel braking force BPB due to the large decrease rate DBPR of the requested braking force, the anti-lift force FAL is reduced in the period from the timing T12 to the timing T13. Therefore, the anti-lift force FAL at the timing T13 can be made smaller than that in the comparative example. That is, when the braking of the vehicle 10 is released, the anti-lift force FAL is sufficiently small, or the anti-lift force FAL is "0". When the anti-lift force FAL is sufficiently small, or when the anti-lift force FAL is "0", the pitch angle AP of the vehicle 10 does not easily change even if the anti-dive force FAD still remains. Therefore, as compared with the case of the comparative example, the change rate of the pitch angle AP of the vehicle 10 can be reduced after the release of the braking of the vehicle 10. Therefore, an occupant of the vehicle 10 is not likely to feel discomfort when the braking of the vehicle 10 is released.

According to the present embodiment, it is possible to shorten a period during which the pitch angle AP of the vehicle changes when the braking of the vehicle is released. As a result, it is possible to shorten the period during which the angle of view of an onboard camera 101 varies. As a result, it is possible to suppress a decrease in accuracy of information obtained from the camera 101 when the braking of the vehicle 10 is released.

Figure 5A:
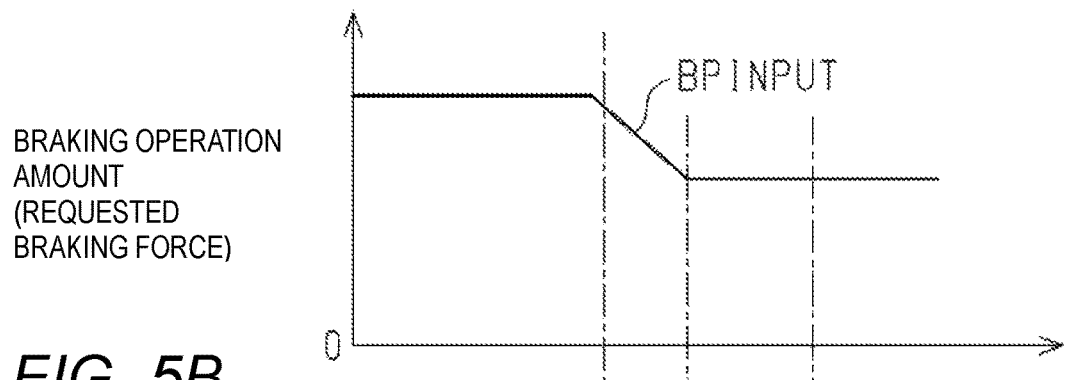
FIGS. 5(a) to 5(d) are timing charts in the case in which the ratio change decrease control is terminated halfway and the ratio restoration control is executed.
Figure 5B:
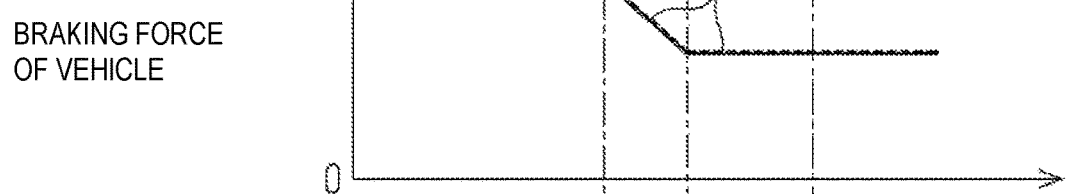
Figure 5C:
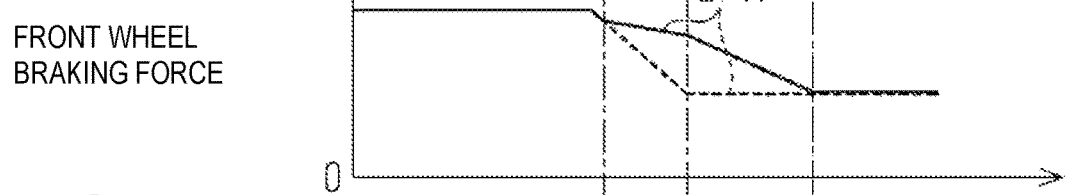
Figure 5D:
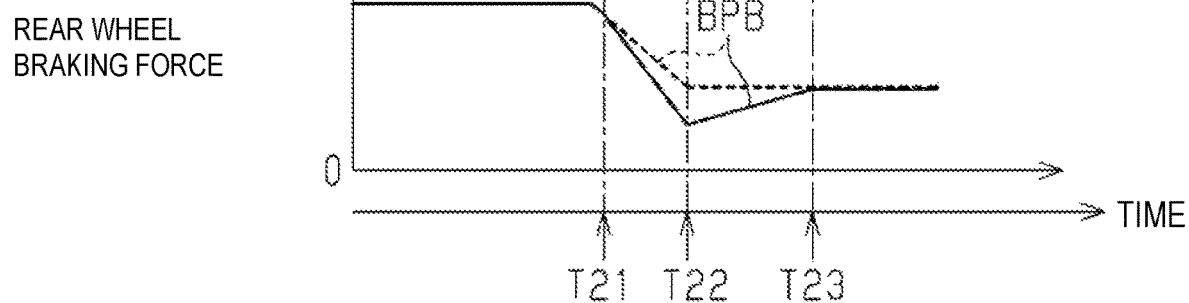

FIGS. 5(a) to 5(d) illustrate an example of the case in which the ratio change decrease control is terminated halfway and the ratio restoration control is executed. FIGS. 5(b), 5(c), and 5(d) show by broken lines, transitions of the braking force BP of the vehicle 10, the front wheel braking force BPA, and the rear wheel braking force BPB in the comparative example, respectively.

When the braking operation amount BPINPUT starts to decrease while the vehicle 10 is decelerating by the application of the braking force BP, it is determined that the requested braking force BPR is decreasing at a timing T21. Then, the ratio change decrease control is started after the reference braking force distribution ratio RTB is set to the same value as the braking force distribution ratio RT at the timing T21. When the ratio change decrease control is executed in this manner, as shown in FIGS. 5(c) and 5(d), the rear wheel braking force BPB is reduced preferentially over the front wheel braking force BPA. That is, the braking force distribution ratio RT becomes smaller than the reference braking force distribution ratio RTB.

In the example illustrated in FIG. 5, the braking operation amount BPINPUT, that is, the requested braking force BPR is held at a timing T22 while the front wheel braking force BPA and the rear wheel braking force BPB are respectively decreasing. Then, the ratio change decrease control is terminated, and the ratio restoration control is started. During the execution of the ratio restoration control, the braking force distribution ratio RT is gradually returned to the reference braking force distribution ratio RTB, that is, the braking force distribution ratio RT at the timing T21. That is, because the braking force distribution ratio RT has become smaller than the reference braking force distribution ratio RTB by executing the ratio change decrease control, the braking force distribution ratio RT is gradually increased. Specifically, while the rear wheel braking force BPB is increased, the front wheel braking force BPA is reduced according to the increase in the rear wheel braking force BPB. Then, when the braking force distribution ratio RT becomes equal to the reference braking force distribution ratio RTB at a timing T23, the ratio restoration control is terminated. When the state in which the braking force BP is applied to the vehicle 10 is continued as described above, the braking force distribution ratio RT is returned to the reference braking force distribution ratio RTB.

Here, in the case in which the braking force distribution ratio RT continues to deviate from the reference braking force distribution ratio RTB even though the braking force BP continues to be applied to the vehicle 10, the distribution balance between the braking force in the front and rear wheels of the vehicle 10 remains unbalanced.

In this regard, in the present embodiment, in the case of continuing the application of the braking force BP to the vehicle 10, the braking force distribution ratio RT is returned to the reference braking force distribution ratio RTB by the execution of the ratio restoration control. Therefore, the state in which the braking force BP is applied to the vehicle 10 does not continue while the distribution balance between the braking force in the front and rear wheels remains unbalanced.

There may be a case in which the requested braking force BPR increases during the execution of the ratio change decrease control. Even in this case, the ratio change decrease control is terminated and the ratio restoration control is started. As a result, the braking force distribution ratio RT is gradually returned to the reference braking force distribution ratio RTB while the braking force BP of the vehicle 10 is made larger according to the increase in the requested braking force BPR.

Second Embodiment

Next, a second embodiment of a vehicle brake control device 50 is described with reference to FIGS. 6 and 7. The second embodiment is different from the first embodiment in characteristics of a vehicle including the brake control device 50. Therefore, in the following description, portions different from those of the first embodiment are mainly described, and the same reference numerals are given to the same or corresponding member configurations as those of the first embodiment, and redundant description are omitted.

Figure 6:
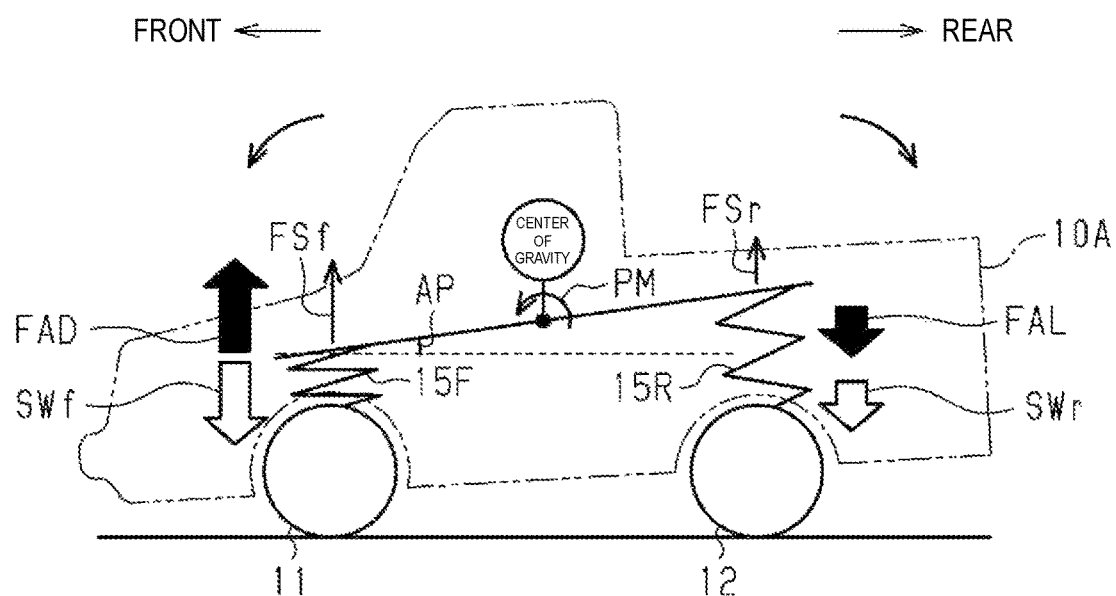
FIG. 6 is a schematic diagram illustrating a state in which a vehicle including a brake control device for a vehicle according to a second embodiment nose-dives.

In FIG. 6, the pitching motion of a vehicle 10A at the time of braking of the vehicle 10A including the brake control device 50 of the present embodiment is described.

The geometries of the front wheel suspension and the rear wheel suspension in the vehicle 10A are set such that the anti-dive force FAD becomes larger than the anti-lift force FAL when the front wheel braking force BPA has the same value as the rear wheel braking force BPB. That is, in the present embodiment, the anti-dive force FAD corresponds to the "first force", and the anti-lift force FAL corresponds to the "second force". In addition, the front wheel braking force BPA generating the anti-dive force FAD corresponds to the "first braking force", and the rear wheel braking force BPB generating the anti-lift force FAL corresponds to the "second braking force". Therefore, the braking force distribution ratio RT is a ratio of the front wheel braking force BPA to the rear wheel braking force BPB.

As illustrated in FIG. 6, when the vehicle 10A stops in a nose-dived state, the vehicle 10A undergoes the pitching motion toward the nose lift side by the anti-dive force FAD and the anti-lift force FAL. That is, the pitch angle AP of the vehicle 10A decreases. At this time, even if the entire braking force being the sum of the front wheel braking force BPA and the rear wheel braking force BPB is constant, because the anti-dive force FAD increases as the proportion of the front wheel braking force BPA becomes larger among the entire braking force, the change rate of the pitch angle AP easily increases. On the other hand, because the anti-dive force FAD decreases as the proportion of the rear wheel braking force BPB becomes smaller in the entire braking force, the change rate of the pitch angle AP does not easily increase.

Therefore, in the present embodiment, the brake control unit 52 reduces the front wheel braking force BPA preferentially over the rear wheel braking force BPB in the ratio change decrease control. Specifically, in the ratio change decrease control, the decrease rate of the front wheel braking force BPA is made larger than the decrease rate of the rear wheel braking force BPB. Therefore, the front wheel braking force BPA becomes "0" before the rear wheel braking force BPB. That is, the braking force distribution ratio RT becomes "0". After the braking force distribution ratio RT has become "0" in this manner, the rear wheel braking force BPB is reduced according to the decrease of the requested braking force BPR while the front wheel braking force BPA is held at "0". That is, it can also be said that the ratio change decrease control is control to set the front wheel braking force BPA being the first braking force to "0" earlier than the rear wheel braking force BPB being the second braking force.

Next, functions and effects of the present embodiment are described with reference to FIG. 7. FIGS. 7(a) to 7(e) illustrate an example of the case in which the ratio change decrease control is executed until the braking of the vehicle 10A is released.

When the braking operation amount BPINPUT starts to decrease while the vehicle 10A is decelerating by the application of the braking force BP, it is determined that the requested braking force BPR is decreasing at a timing T31. Then, the ratio change decrease control is started after the reference braking force distribution ratio RTB is set to the same value as the braking force distribution ratio RT at the timing T31.

FIGS. 7(a), 7(c), 7(d), and 7(e) show by broken lines, transitions of the vehicle body acceleration DVS, the braking force BP of the vehicle 10A, the front wheel braking force BPA, and the rear wheel braking force BPB in the comparative example, respectively. In the comparative example, the front wheel braking force BPA and the rear wheel braking force BPB each become "0" at a timing T33 when the requested braking force BPR becomes "0". That is, the braking force is applied to a front wheel 11 until immediately before the braking of the vehicle 10A is released.

In the present embodiment, when the front wheel braking force BPA has the same value as the rear wheel braking force BPB, the anti-dive force FAD is larger than the anti-lift force FAL. Therefore, in the case of the comparative example, if the decrease rate DBPR of the requested braking force is large, a response delay of the decrease of the anti-dive force FAD occurs with respect to the decrease of the front wheel braking force BPA, and the anti-dive force FAD may not yet be "0" even when the front wheel braking force BPA has become "0". That is, although the braking of the vehicle 10A is released, the anti-dive force FAD still remains. In this case, the change in the pitch angle AP of the vehicle 10A may not yet be finished even after the braking of the vehicle 10A is released.

Figure 7A:
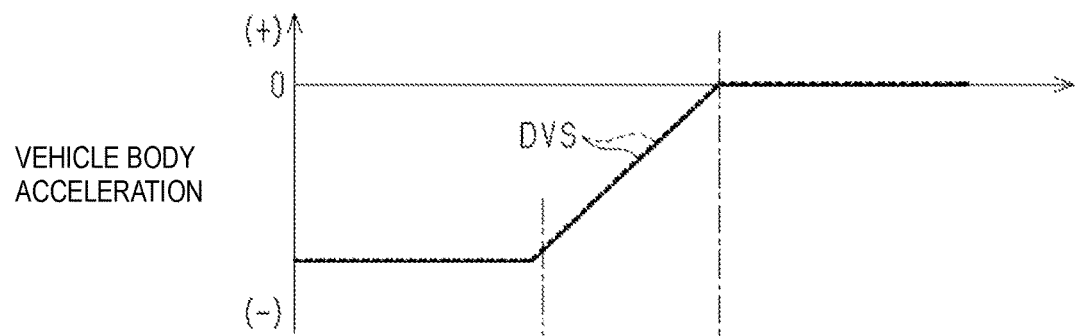
FIGS. 7(a) to 7(e) are timing charts in the case in which the ratio change decrease control is executed in the second embodiment.
Figure 7B:
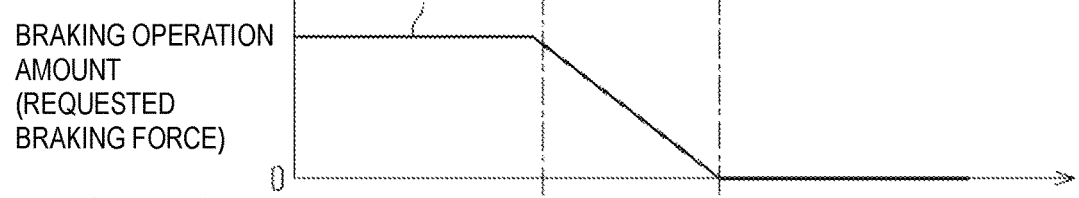
Figure 7C:
Figure 7D:
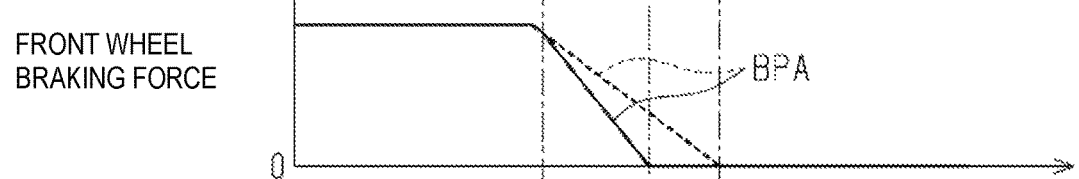
Figure 7E:
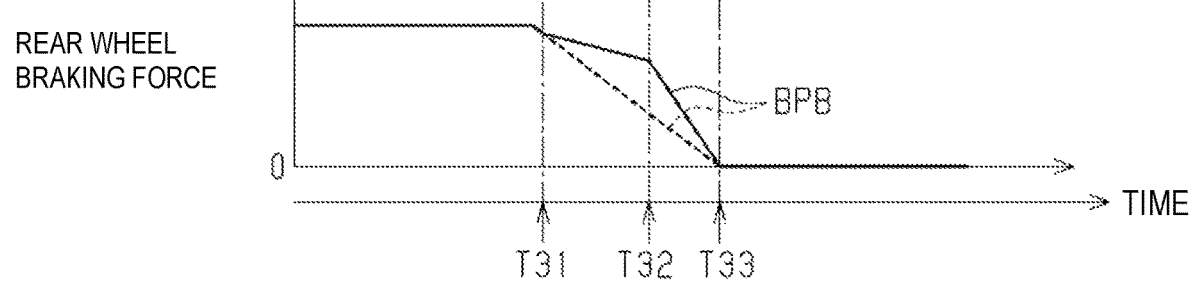

In this regard, in the present embodiment, the front wheel braking force BPA and the rear wheel braking force BPB are respectively reduced as indicated by solid lines in FIGS. 7(d) and 7(e) by executing the ratio change decrease control. That is, the front wheel braking force BPA is reduced so that the front wheel braking force BPA becomes "0" at a timing T32 before the timing T33. On the other hand, the rear wheel braking force BPB is gradually reduced in a period from the timing T31 to the timing T32, and the rear wheel braking force BPB is suddenly reduced in a period from the timing T32 to the timing T33. As a result, as illustrated in FIGS. 7(a) and 7(c), the braking force BP and the vehicle body acceleration DVS of the vehicle 10A can be changed as in the comparative example while the braking force distribution ratio RT is changed from the reference braking force distribution ratio RTB.

In the present embodiment, as shown in FIG. 7(e), the front wheel braking force BPA becomes "0" at the timing T32 before the timing T33. Therefore, even if the response delay of the decrease of the anti-dive force FAD occurs with respect to the decrease of the front wheel braking force BPA due to the large decrease rate DBPR of the requested braking force, the anti-dive force FAD is reduced in the period from the timing T32 to the timing T33.

Therefore, the anti-dive force FAD at the timing T33 can be made smaller than in the case of the comparative example. That is, when the braking of the vehicle 10A is released, the anti-dive force FAD is sufficiently small, or the anti-dive force FAD is "0". When the anti-dive force FAD is sufficiently small, or when the anti-dive force FAD is "0", the pitch angle AP of the vehicle 10A does not easily change even if the anti-lift force FAL still remains. Therefore, as compared with the case of the comparative example, the change rate of the pitch angle AP of the vehicle 10A can be reduced after the release of the braking of the vehicle 10A. Therefore, an occupant of the vehicle 10A is not likely to feel discomfort when the braking of the vehicle 10A is released.

Each of the above embodiments can be modified as follows. The above embodiments and the following modified examples can be implemented in combination with each other within a range not technically contradictory.

In each of the above embodiments, if the braking force distribution ratio RT can be made smaller than the reference braking force distribution ratio RTB in the ratio change decrease control, the front wheel braking force BPA and the rear wheel braking force BPB may be reduced in a mode different from the mode described in each of the above embodiments.

Figure 8A:
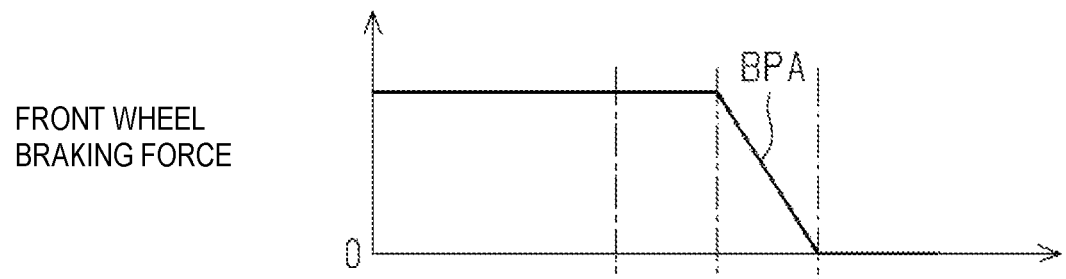
FIGS. 8(a) and 8(b) are timing charts in the case in which the ratio change decrease control is executed in the modified example.
Figure 8B:
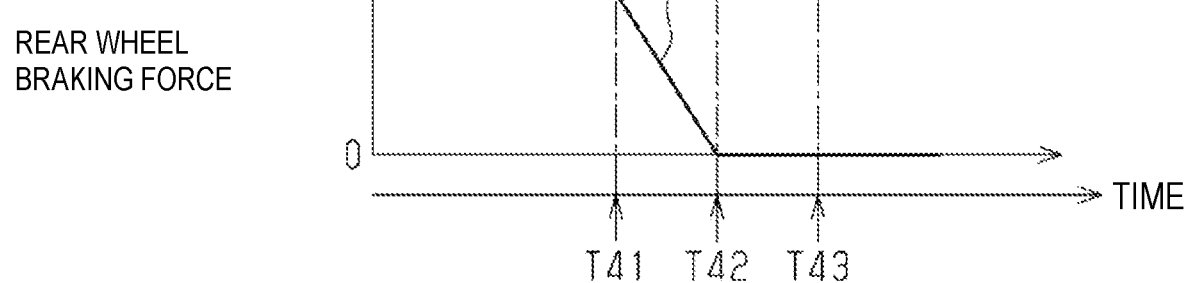

FIGS. 8(a) and 8(b) illustrate transitions of the front wheel braking force BPA and the rear wheel braking force BPB in the modified example of the ratio change decrease control in the first embodiment. That is, as shown in FIG. 8, when the ratio change decrease control is started at a timing T41, the rear wheel braking force BPB is reduced while the front wheel braking force BPA is held in a period from the timing T41 to a timing T42. Even in this case, the braking force distribution ratio RT can be made smaller than the reference braking force distribution ratio RTB being the braking force distribution ratio RT at the timing T41. When the rear wheel braking force BPB becomes "0" at the timing T42, the braking force distribution ratio RT becomes "0", therefore, the front wheel braking force BPA is reduced from the timing T42. Then, when the front wheel braking force BPA also becomes "0" at a timing T43, the ratio change decrease control is terminated.

By reducing the rear wheel braking force BPB while holding the front wheel braking force BPA until the rear wheel braking force BPB becomes "0", and then reducing the front wheel braking force BPA after the rear wheel braking force BPB become has become "0", the rear wheel braking force BPB can be set to "0" earlier than in the case of the first embodiment. As a result, the anti-lift force FAL is less likely to remain at the timing T43 when the braking of the vehicle 10 is released. As a result, it is possible to further enhance the effect of reducing the change rate of the pitch angle AP after the release of the braking of the vehicle 10.

In the case of the second embodiment, the front wheel braking force BPA may be reduced while the rear wheel braking force BPB is held until the front wheel braking force BPA becomes "0", and then the rear wheel braking force BPB may be reduced after the front wheel braking force BPA has become "0". According to this configuration, the front wheel braking force BPA can be set to "0" earlier than in the case of the second embodiment. As a result, the anti-dive force FAD is less likely to remain when the braking of the vehicle 10A is released. As a result, it is possible to further enhance the effect of reducing the change rate of the pitch angle AP after the release of the braking of the vehicle 10A.

In each of the above embodiments, in the case in which the requested braking force BPR is held during the execution of the ratio change decrease control, the ratio restoration control may not be executed after the ratio change decrease control is terminated. In this case, the braking force distribution ratio RT may be held at a value at a time point of terminating the ratio change decrease control. In addition, in the case in which the requested braking force BPR is held during the execution of the ratio change decrease control, the control of increasing the braking force distribution ratio RT but not increasing the braking force distribution ratio RT until the reference braking force distribution ratio RTB is reached may be executed.

In each of the above embodiments, in the case in which the requested braking force BPR is increased during the execution of the ratio change decrease control, the ratio restoration control may not be executed after the ratio change decrease control is terminated. In this case, the braking force BP of the vehicle may be increased according to the increase in the requested braking force BPR while the braking force distribution ratio RT is held at the value at the time point of terminating the ratio change decrease control. In addition, in the case in which the requested braking force BPR is increased during the execution of the ratio change decrease control, the control of increasing the braking force distribution ratio RT but not increasing the braking force distribution ratio RT until the reference braking force distribution ratio RTB is reached may be executed.

In each of the above embodiments, even if the requested braking force BPR is less than the determination braking force BPRTh, the ratio change decrease control may be executed when it is determined that the requested braking force BPR has started to decrease.

In each of the above embodiments, if it is determined that the requested braking force BPR has started to decrease, the ratio change decrease control may be executed even when the decrease rate DBPR of the requested braking force is less than the determination decrease rate DBPRTh.

The braking device may have any configuration as long as the front wheel braking force BPA and the rear wheel braking force BPB can be individually controlled. For example, the braking device may be an electric braking device that can apply friction braking force to the wheels without using brake fluid.

The front wheel braking force BPA may be the sum of the friction braking force applied to the front wheel 11 by the operation of the braking mechanism 13 and the regenerative braking force applied to the front wheel 11 by the power generation of the generator.

The rear wheel braking force BPB may be the sum of the friction braking force applied to the rear wheel 12 by the operation of the braking mechanism 13 and the regenerative braking force applied to the rear wheel 12 by the power generation of the generator.

The invention claimed is:

1. A brake control device for a vehicle applied to a vehicle in which an anti-dive force being a force that displaces a vehicle front portion upward is generated when a braking force is applied to a front wheel, an anti-lift force being a force that displaces a vehicle rear portion downward is generated when the braking force is applied to a rear wheel, and when a front wheel braking force being a braking force applied to the front wheel has a value equal to a rear wheel braking force being a braking force applied to the rear wheel, a first force that is one of the anti-dive force and the anti-lift force becomes larger than a second force that is another of the anti-dive force and the anti-lift force, the brake control device comprising: in the case in which, among the front wheel braking force and the rear wheel braking force, a braking force that generates the first force is set as a first braking force, a braking force that generates the second force is set as a second braking force, and a ratio of the first braking force to the second braking force is set as a braking force distribution ratio, a decrease determination unit that determines whether a requested braking force for the vehicle is decreasing; and a brake control unit that executes, on a condition that the decrease determination unit determines that the requested braking force is decreasing during deceleration of the vehicle, ratio change decrease control of reducing the braking force of the vehicle according to the decrease of the requested braking force, while making the braking force distribution ratio smaller than a reference braking force distribution ratio being the braking force distribution ratio at a time point when the requested braking force starts to decrease.

2. The brake control device for the vehicle according to claim 1,
wherein the brake control unit executes the ratio change decrease control on a condition that a decrease rate of the requested braking force is equal to or more than a determination decrease rate, in addition to the condition that the decrease determination unit determines that the requested braking force is decreasing during deceleration of the vehicle.

3. The brake control device for the vehicle according to claim 2,
wherein the brake control unit executes the ratio change decrease control on a condition that the braking force of the vehicle before the determination is made is equal or more than a determination braking force, in addition to the condition that the decrease determination unit determines that the requested braking force is decreasing during deceleration of the vehicle.

4. The brake control device for the vehicle according to claim 3,
wherein when the decrease determination unit no longer determines that the requested braking force is decreasing during the execution of the ratio change decrease control, the brake control unit terminates the ratio change decrease control, and executes ratio restoration control of increasing the braking force distribution ratio to the reference braking force distribution ratio by adjusting each of the first braking force and the second braking force.

5. The brake control device for the vehicle according to claim 4,
wherein, in the ratio change decrease control, the brake control unit reduces the first braking force while holding the second braking force until the first braking force becomes "0", and reduces the second braking force after the first braking force has become "0".

6. The brake control device for the vehicle according to claim 3,
wherein, in the ratio change decrease control, the brake control unit reduces the first braking force while holding the second braking force until the first braking force becomes "0", and reduces the second braking force after the first braking force has become "0".

7. The brake control device for the vehicle according to claim 2,
wherein when the decrease determination unit no longer determines that the requested braking force is decreasing during the execution of the ratio change decrease control, the brake control unit terminates the ratio change decrease control, and executes ratio restoration control of increasing the braking force distribution ratio to the reference braking force distribution ratio by adjusting each of the first braking force and the second braking force.

8. The brake control device for the vehicle according to claim 2,
wherein, in the ratio change decrease control, the brake control unit reduces the first braking force while holding the second braking force until the first braking force becomes "0", and reduces the second braking force after the first braking force has become "0".

9. The brake control device for the vehicle according to claim 1,
wherein the brake control unit executes the ratio change decrease control on a condition that the braking force of the vehicle before the determination is made is equal or more than a determination braking force, in addition to the condition that the decrease determination unit determines that the requested braking force is decreasing during deceleration of the vehicle.

10. The brake control device for the vehicle according to claim 9,
wherein when the decrease determination unit no longer determines that the requested braking force is decreasing during the execution of the ratio change decrease control, the brake control unit terminates the ratio change decrease control, and executes ratio restoration control of increasing the braking force distribution ratio to the reference braking force distribution ratio by adjusting each of the first braking force and the second braking force.

11. The brake control device for the vehicle according to claim 9,
wherein, in the ratio change decrease control, the brake control unit reduces the first braking force while holding the second braking force until the first braking force becomes "0", and reduces the second braking force after the first braking force has become "0".

12. The brake control device for the vehicle according to claim 1,
wherein when the decrease determination unit no longer determines that the requested braking force is decreasing during the execution of the ratio change decrease control, the brake control unit terminates the ratio change decrease control, and executes ratio restoration control of increasing the braking force distribution ratio to the reference braking force distribution ratio by adjusting each of the first braking force and the second braking force.

13. The brake control device for the vehicle according to claim 12,
wherein, in the ratio change decrease control, the brake control unit reduces the first braking force while holding the second braking force until the first braking force becomes "0", and reduces the second braking force after the first braking force has become "0".

14. The brake control device for the vehicle according to claim 1,
wherein, in the ratio change decrease control, the brake control unit reduces the first braking force while holding the second braking force until the first braking force becomes "0", and reduces the second braking force after the first braking force has become "0".

* * * * *